(12) United States Patent
Bardy

(10) Patent No.: US 9,169,008 B2
(45) Date of Patent: Oct. 27, 2015

(54) METHOD OF ARRANGING A BUOYANCY SYSTEM ON AN AIRCRAFT, A BUOYANCY SYSTEM FOR AN AIRCRAFT, AND AN AIRCRAFT

(71) Applicant: AIRBUS HELICOPTERS, Marignane, Cedex (FR)

(72) Inventor: Alexandre Bardy, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 3 days.

(21) Appl. No.: 14/086,075

(22) Filed: Nov. 21, 2013

(65) Prior Publication Data
US 2014/0145030 A1    May 29, 2014

(30) Foreign Application Priority Data
Nov. 27, 2012   (FR) ...................... 12 03198

(51) Int. Cl.
*B64C 25/18*   (2006.01)
*B64C 25/56*   (2006.01)
*B64D 25/18*   (2006.01)

(52) U.S. Cl.
CPC ............... *B64C 25/56* (2013.01); *B64D 25/18* (2013.01); *Y10T 29/49826* (2015.01); *Y10T 29/49947* (2015.01)

(58) Field of Classification Search
CPC ............................... B64C 25/56; B64D 25/18
See application file for complete search history.

(56) References Cited

U.S. PATENT DOCUMENTS

| | | | |
|---|---|---|---|
| 3,004,737 A | 10/1961 | Boyle et al. | |
| 3,506,222 A * | 4/1970 | Anderson | 244/101 |
| 4,655,415 A * | 4/1987 | Miller et al. | 244/105 |
| 7,115,010 B2 * | 10/2006 | Parrott et al. | 441/40 |
| 7,156,033 B2 * | 1/2007 | Mears et al. | 114/68 |
| 8,079,547 B2 | 12/2011 | Rivault et al. | |

FOREIGN PATENT DOCUMENTS

| | | |
|---|---|---|
| EP | 0001607 A2 | 5/1979 |
| EP | 0001607 A3 | 5/1979 |
| FR | 1599828 | 7/1970 |
| FR | 2517620 | 6/1983 |

OTHER PUBLICATIONS

Search Report for FR 1203198, Completed by the French Patent Office on May 27, 2013, 7 Pages.

* cited by examiner

*Primary Examiner* — Justin Benedik
(74) *Attorney, Agent, or Firm* — Brooks Kushman P.C.

(57) ABSTRACT

A buoyancy system (10) for an aircraft (1), said buoyancy system (10) comprises an inflatable float (15) and a cover (20). Said buoyancy system (10) includes at least one extensible connection means (25) fastened to the cover (20) to connect the cover (20) to a compartment (3) of an aircraft (1), while enabling the cover (20) to be retained and to be moved transversely during inflation of the float (15).

19 Claims, 3 Drawing Sheets

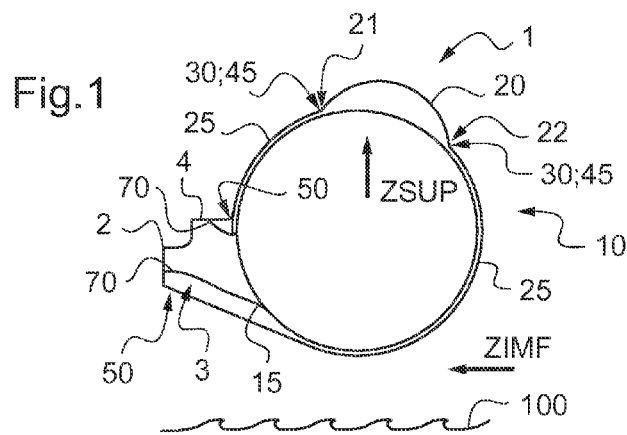
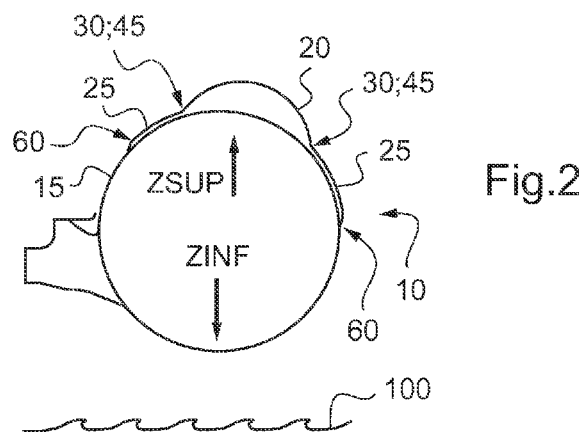
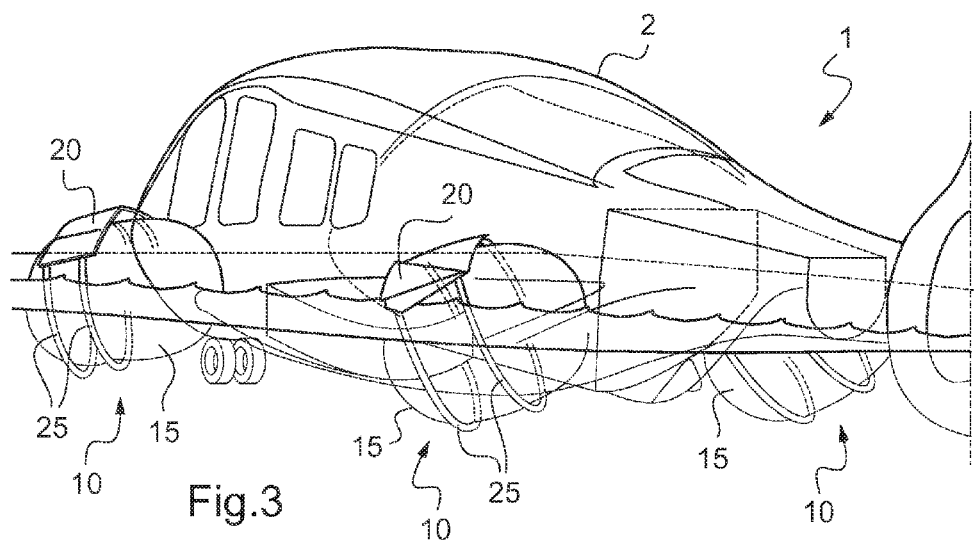

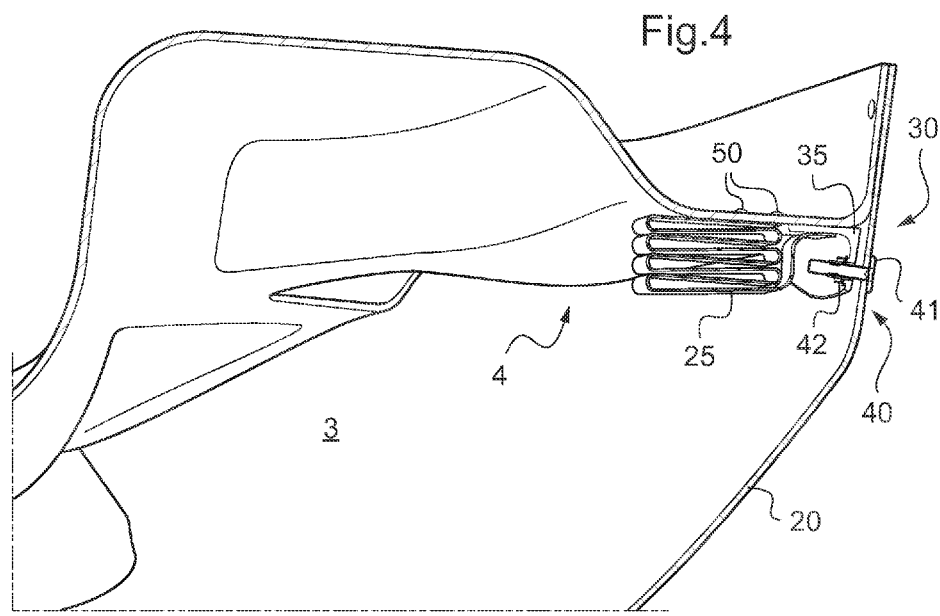
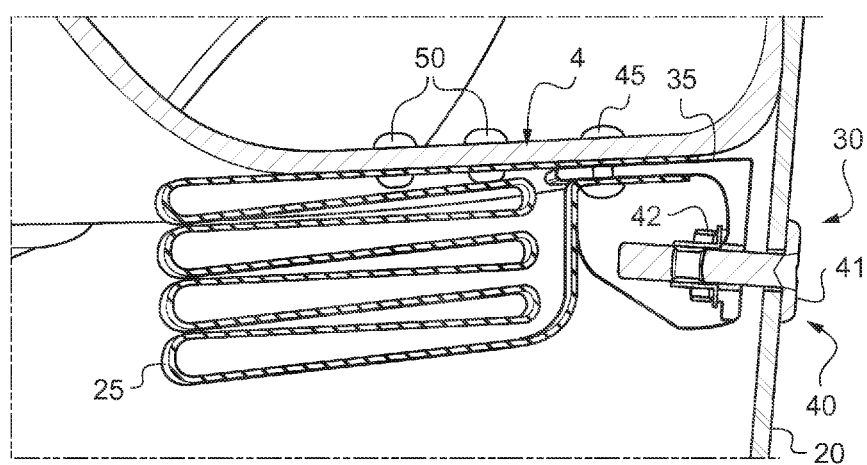

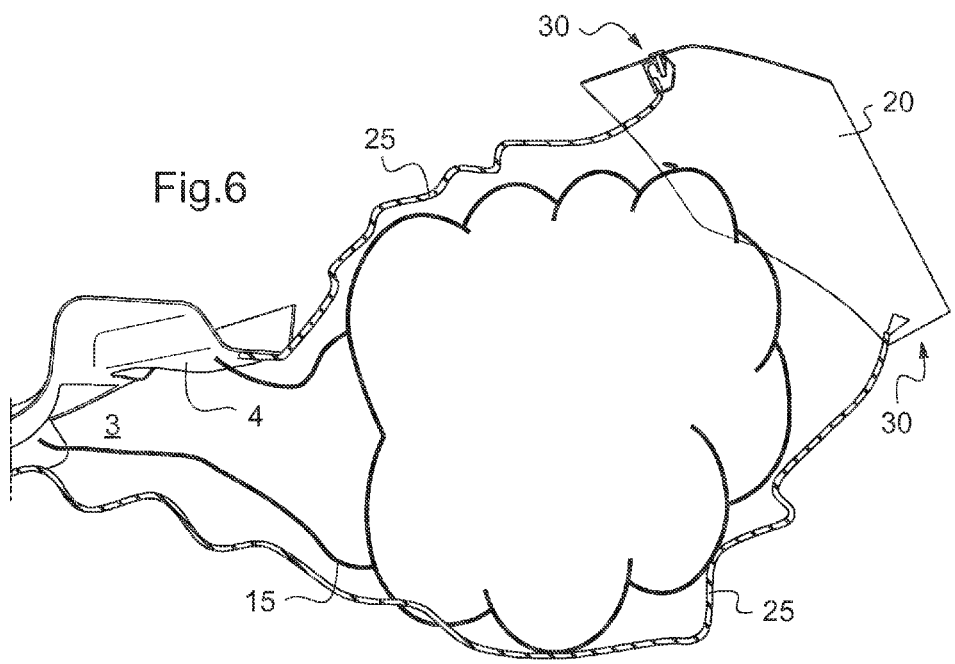
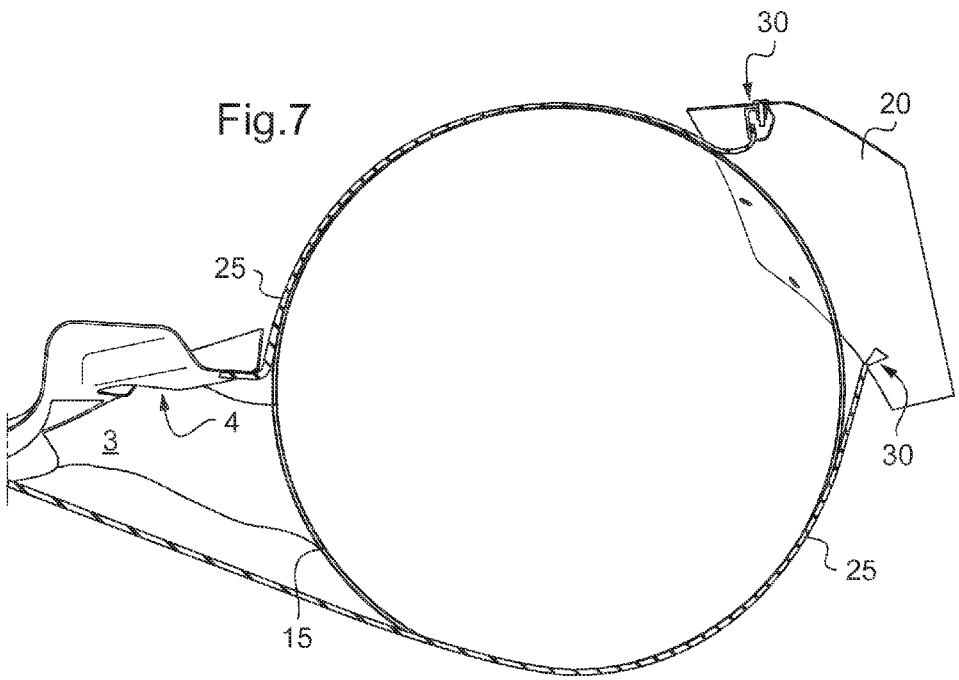

METHOD OF ARRANGING A BUOYANCY SYSTEM ON AN AIRCRAFT, A BUOYANCY SYSTEM FOR AN AIRCRAFT, AND AN AIRCRAFT

CROSS REFERENCE TO RELATED APPLICATION

This application claims priority to French patent application No. FR 12 03198 filed on Nov. 27, 2012, the disclosure of which is incorporated in its entirety by reference herein.

BACKGROUND OF THE INVENTION (1) Field of the Invention

The present invention relates to a method of arranging a buoyancy system on an aircraft, to a buoyancy system for an aircraft, and to an aircraft provided with a buoyancy system.

The invention thus lies in the technical field of buoyancy systems enabling an aircraft, and more particularly an aircraft having a rotary wing, to ditch on water and to float in stable manner thereon.

Such a buoyancy system contributes to providing an aircraft with buoyancy and stability on ditching. When ditching has been forced, the buoyancy system may be used in particular in order to enable the occupants of the aircraft to be evacuated therefrom.

(2) Description of Related Art

A buoyancy system may comprise inflatable floats that are deployed either on command of the pilot and/or the copilot, or else on being triggered automatically, in particular by one or more immersion detectors. Such floats may comprise bags that are inflated by explosive or electrical deployment means, for example.

Under such circumstances, an aircraft may have a float that is arranged in a compartment. The compartment is then open to the outside in order to allow the float to be deployed. The aircraft may also have closure means for closing the compartment other than while ditching, while nevertheless enabling the compartment to be opened prior to ditching in order to deploy the float.

Conventionally, a float may comprise an inflatable bag folded in the volume available inside a compartment.

In a first embodiment, the float is fastened to a compartment of an aircraft, e.g. by straps. The compartment is also closed by a flexible tarpaulin.

Thus, when the float inflation means are activated, the volume of the float increases. Since the tarpaulin is flexible, it gives way under the pressure exerted by the float. The float then deploys so as to become operational.

In a second embodiment that is better optimized in terms of aerodynamics and/or appearance, the float is arranged in a compartment that is closed by a cover that is semirigid or rigid. A cover that is semirigid or rigid is referred to below as a "rigid" cover. A rigid cover is thus a cover that retains its shape under normal conditions of use, unlike a flexible cover and/or a flexible tarpaulin.

In a first variant of the second embodiment, an inflatable float is fastened to the aircraft, e.g. by straps, the compartment being closed by an ejectable cover. The cover can thus be ejected in order to enable an inflatable float to be deployed. Nevertheless, that variant can lead to harmful ejection of a cover towards an element of the aircraft, or indeed towards an inhabited region. Such ejection might be caused by untimely opening.

When overflying a stretch of water, the cover may also be ejected onto the liquid surface being overflown. Under such circumstances, when ditching, the ejected cover can become jammed between said liquid surface and the aircraft. The cover then runs the risk of giving rise to damage.

In a second variant of the second embodiment, an inflatable float is fastened to the aircraft by straps, with the compartment being closed by a cover that is rigid and movable, being hinged to the fuselage. The cover may optionally be a door that is fastened to the fuselage by a plurality of hinges.

The cover can thus be moved so as to allow an inflatable float to be deployed. For example, the cover may pivot in order to open the compartment.

That variant is advantageous, but implementing it can be complex.

Furthermore, the cover may constitute a danger at the time of ditching, depending on its location. Such a rigid and movable cover will be moved under the impact of ditching. The cover can therefore become wedged against the aircraft and/or the float, and runs the risk of damaging a portion of the aircraft and/or of the float.

In a third variant of the second embodiment, the cover is fastened to the inflatable float. The inflatable float is thus folded and then attached to the cover, e.g. by adhesive. The assembly comprising the float and the cover is then inserted into the compartment.

That third variant is advantageous. While the float is being deployed, the cover is moved away from the aircraft. Any risk of the cover damaging the aircraft is therefore reduced.

Nevertheless, folding the float can be difficult.

In addition, that configuration makes access to the compartment more complex. Since the inflatable float is contained in the cover, opening the cover, e.g. for maintenance purposes, can be dangerous.

In this context, it can be seen from the state of the art that installing an inflatable float on an aircraft is far from straightforward and raises numerous difficulties.

The state of the art includes document U.S. Pat. No. 3,004,737. That document describes a cover that is hinged to a fuselage.

Document FR 1 599 828 relates to landing gear for an aircraft. An inflatable tube is retracted into an enclosure formed by flexible covering elements.

Document U.S. Pat. No. 8,079,547 describes an emergency float combined with an emergency raft.

Document U.S. Pat. No. 4,655,415 discloses an emergency float attached to the landing skid of an aircraft.

Document U.S. Pat. No. 7,156,033 describes an airplane having a buoyancy system including an ejectable cover.

Document FR 2 517 620 describes a float having a protective shield.

Document EP 0 001 607 describes landing gear provided with a float.

BRIEF SUMMARY OF THE INVENTION

An object of the present invention is thus to provide a method for enabling an aircraft to float and seeking to enable a protective cover to be used.

The invention thus provides a method of arranging a buoyancy system on an aircraft, the buoyancy system comprising an inflatable float and a cover. The aircraft is thus provided with a compartment for receiving the folded inflatable float, which compartment may be closed by the cover.

Under such circumstances, the method comprises connecting said cover to a compartment of the aircraft via at least one extensible connection means in order to enable the cover to be retained and to be moved transversely while the float is inflating.

Non-extensible connection means may also be provided. For example, the buoyancy system may include at least two extensible connection means, or indeed at least one extensible connection means and at least one non-extensible connection means.

It can be understood that each of the connection means may co-operate with different sides of the cover in order to fasten it to the aircraft.

The term "cover" is used to mean a fairing having either a single plate or else a plurality of plates connected together. When the cover comprises a plurality of plates, two adjacent plates may be connected together by at least one extensible connection means, or indeed by a fuse connection.

Each connection means thus comprises a flexible connection extending in a length direction that is capable of lengthening under the effect of a traction force. Each connection means may comprise an elastic strap, for example.

Consequently, the cover is attached to the aircraft by elastic connection means, and possibly also by fuse members.

When the float is deployed, the cover remains attached to the aircraft. Thus, problems associated with ejecting a cover ought to be avoided.

In addition, since the connection means are extensible, the cover does not impede deployment of the float. On the contrary, when the float inflates, the cover is pushed by the float and then moves transversely away from the compartment.

The invention thus makes it possible to keep a cover close to the aircraft while limiting any risk of it interfering with the aircraft.

In addition, it should be observed that the cover does not need to be bonded to the float.

Under such conditions, using a cover that is connected to a compartment for an inflatable float by extensible means is found to be a technical solution that is both satisfactory and relatively simple to implement.

This method may also include one or more of the following additional characteristics.

It is possible to fasten the cover to a compartment via a fuse connection. The fuse connection should then be dimensioned so as to release under pressure from the float while it is inflating.

In addition, it is possible to fasten the cover to each connection means by reversible fastener means so as to enable the cover to be dismantled, for maintenance purposes, should that be necessary.

By way of example, and as explained below, it is possible to fasten the cover by means of a bolt to a bracket of connection means, the bracket being fastened by fuse means to a compartment.

The cover is thus independent of the float. The cover is not directly involved with folding the float within the compartment.

An operator can thus fold the float in the compartment. Thereafter the operator can close the compartment with the cover.

In addition, the cover may be removed in order to perform maintenance.

It should be observed that it is possible to remove the cover temporarily before a specific flight in order to reduce the weight of the aircraft, in particular during that flight. The compartment may then possibly be closed using a tarpaulin.

In a first implementation, the cover is connected to the compartment via the connection means.

In a second implementation, the cover is connected to the compartment via the connection means and the float, the float being fastened to at least one internal wall defining the compartment, the cover being fastened to the float via the connection means.

The cover is fastened to the float at one point only. Under such circumstances, this second implementation has no major impact on folding the float.

By way of example, the operator folds the float inside the compartment and then fastens the cover to the connection means in order to close the compartment.

Furthermore, the float, once inflated, presents a bottom zone likely to impact against a liquid surface, and a top zone that is not likely to impact the liquid surface, with the cover being arranged facing the top zone.

It can be understood that a manufacturer can easily identify the portions of the float that will be immersed in a liquid after ditching. The cover and the connection means are thus dimensioned so as to position the cover facing a zone that does not become immersed as a result of ditching.

Thus, there is no risk of the cover damaging the float by coming between the float and the liquid surface.

The invention also provides a buoyancy system for performing the method.

Such a buoyancy system for an aircraft then comprises an inflatable float and a cover.

The buoyancy system includes at least two extensible connection means fastened to the cover to connect the cover to a compartment of the aircraft, while enabling the cover to be retained and moved transversely during inflation of the float.

The buoyancy system may also include means for inflating the float.

The buoyancy system may also include one or more of the following characteristics.

Thus, the buoyancy system may include one reversible fastener means per connection means in order to fasten each connection means reversibly to the cover.

Consequently, the cover may be relatively independent of the float and of the compartment, and in particular may be removable therefrom.

The reversible connection means may comprise a bracket fastened firstly to the cover by reversible engagement means and fastened secondly to connection means.

The reversible engagement means may comprise a bolt and a nut that is secured to the bracket, for example.

Furthermore, the fastener means include a fuse fastener member for fastening the cover to a compartment.

Optionally, at least one bracket is fastened in reversible manner to the cover and by a fuse fastener member to a fuselage of an aircraft. By way of example, the fastener member may comprise at least one fuse pin.

The bracket may also be fastened to elastic connection means in order to minimize the number of mechanical parts and in order to simplify the system.

In addition, each connection means in a first embodiment includes a fastener device for being fastened to a compartment of an aircraft.

In a second embodiment, each connection means includes a fastener system for fastening to the float.

These two embodiments may be combined, a cover being fastened both to the fuselage of an aircraft via at least one extensible connection means and also to the float via at least one extensible connection means.

Independently of the embodiment, the float may optionally include a connection device for connecting to a compartment of an aircraft.

Finally, the invention provides an aircraft having a compartment and a buoyancy system, the aircraft including one or more inflatable floats arranged in the compartment, and a cover closing said compartment. The compartment may be of the container type or it may equally well be of the type comprising a structural well.

The buoyancy system is of the type described above, the buoyancy system including at least one extensible connection means fastened to the cover in order to connect the cover to said compartment while allowing the cover to be retained and to be moved transversely during inflation of the float.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 1 is a diagram showing a first embodiment of the invention;

FIG. 2 is a diagram showing a second embodiment of the invention;

FIG. 3 shows an aircraft fitted with inflated floats;

FIG. 4 is a view showing a compartment closed by a cover;

FIG. 5 is a diagram showing a cover fitted with a fastener bracket; and

FIGS. 6 and 7 are diagrams explaining the operation of the invention in the first embodiment.

Elements present in more than one of the figures are given the same references in each of them.

DETAILED DESCRIPTION OF THE INVENTION

FIG. 1 shows an aircraft 1 having a fuselage 2. The fuselage 2 includes in particular an internal wall 4 defining part of a compartment 3. The compartment 3 is thus open to the outside of the aircraft.

Furthermore, the aircraft has at least one buoyancy system 10 so as to enable it to be supported on a liquid surface, at least temporarily.

It should be observed that the other elements of the aircraft are not shown in FIG. 1 for simplification purposes. For example, the aircraft may have a rotary wing carried by the fuselage 2.

The buoyancy system 10 comprises a float 15 that is inflatable. The float 15 is thus provided with a bag suitable for being folded in the compartment 3.

The float is thus fastened to the compartment 3 by a conventional connection device 70. By way of example, a portion of the bag of the float 15 is adhesively bonded to an internal wall 4 of the compartment.

Furthermore, the buoyancy system 10 has a conventional device for inflating the float. When the float is inflated, it projects out from the compartment 3. FIG. 1 thus shows a float that is inflated.

In order to close the compartment 3, other than when ditching on water, the buoyancy system 10 has a cover 20 suitable for closing the compartment 3. The cover may perform an appearance function and indeed an aerodynamic function.

Furthermore, the buoyancy system 10 is provided with at least one extensible connection means 25. Each connection means 25 is fastened to the cover in order to connect the cover 20 to the compartment 3, while also enabling the cover 20 to be retained and moved transversely while the float 15 is inflating. Such connection means may comprise straps, possibly elastic straps.

In order to control the movement of the cover, the buoyancy system includes at least two connection means fastened to opposite sides 21 and 22 of the cover 20.

Consequently, the float 15 and the connection means 25 are folded in the compartment during normal conditions of use, i.e. when not ditching. The cover then closes the compartment 3.

In contrast, the float 15 is inflated when ditching. Instead of being ejected, the cover remains connected to the fuselage of the aircraft by the connection means 25.

It might be thought that the cover would then interfere with inflation of the float. Nevertheless, since the connection means are extensible, the cover can move transversely away from the float so as not to impede inflation of the float.

Each connection means comprise elastic straps. Nevertheless, non-elastic straps may suffice. Such straps are extensible insofar as they can stretch from a short length when folded, to a long length when unfolded.

Thus, in the method performed by the invention, the cover 20 is connected to the compartment 3 by at least one extensible connection means 25 in order to enable the cover 20 to be retained and to be moved transversely while the float 15 is inflating. At least one other extensible connection means or non-extensible means may be added.

It is also possible to connect the cover 20 to the aircraft by reversible system so as to enable the cover to be dismantled, and fuse systems in order to enable the cover 20 to move away during inflation of the float.

For example, the cover 20 is fastened to each connection means 25 by reversible fastener means 30, while also providing a fuse fastener member 25 for fastening the cover to the aircraft. These means and these members are described in greater detail below.

In the variant shown in FIG. 1, once inflated, the float 15 presents a bottom zone ZINF that is liable to impact against the liquid surface 100, and a top zone ZSUP is not liable to impact against said liquid surface 100. The manufacturer can use simulation and/or testing in order to determine the extent of these bottom and top zones ZINF and ZSUP.

The manufacturer can then design the buoyancy means of the invention so as to arrange the cover 20 so that it faces the top zone ZSUP when the float has inflated.

In a first implementation of the method of the invention, the cover 20 is connected directly to the compartment 3 by the connection means 25.

With reference to FIG. 1, the cover 20 is fastened to each connection means 25 by fastener means 30.

In addition, each connection means 25 is fastened to the compartment 3 by a fastener device 50.

Under such circumstances, the cover is fastened to the compartment by the connection means.

In a second implementation of the method of the invention, the cover 20 is connected to the compartment 3 by the connection means 25 and the float 15. The float is fastened to at least one internal wall 4 defining the compartment 3, with the cover 20 being fastened to the float 15 by the connection means 25.

With reference to FIG. 2 for explaining this second implementation, the cover 20 is fastened to each connection means 25 by fastener means 30.

Furthermore, each connection means 25 is fastened to the float 15 by a fastener system 60, the float 15 itself being fastened to the compartment 3.

FIG. 3 shows an aircraft 1 having a plurality of buoyancy systems 10.

In this variant, each buoyancy system 10 comprises two pairs of connection means 25 in order to retain a cover 20.

FIGS. 4 to 7 explain a version of the invention in the first embodiment.

In this version and with reference to FIG. 4, a buoyancy system 10 is provided with fastener means 30 comprising one bracket 35 per connection means 25.

With reference to FIG. 5, the bracket 35 is secured to the connection means 25 by conventional means, such as rivets, for example.

In addition, the bracket is fastened to the cover 20. This bracket can thus fasten the connection means 25 to the cover 20.

Nevertheless, this fastening may be reversible. Under such circumstances, the bracket is attached to the cover 20 by reversible engagement means 40. By way of example, the engagement means 40 may comprise a nut 42 secured to the bracket and a bolt 41 or the equivalent. The bolt 41 is then screwed into the nut 42 in order to fasten the cover to the bracket, and thus to the connection means 25.

In addition, the cover may be fastened reversibly to the compartment 3.

Thus, the bracket 35 may be attached to the compartment 3 by a fuse fastener member.

An operator then folds a float inside the compartment 3.

The operator also fastens the bracket to an internal wall 4 using a fuse fastener member, such as a pin or a rivet that is designed to shear as from a given force.

The bracket is also fastened to a first end of connection means 25. The second end of the connection means 25 is then fastened to the compartment in the first embodiment.

In the second embodiment, this second end is secured to a float.

The connection means can then be folded.

The operator can finally close the compartment using the cover and the engagement means 40.

In order to access the compartment, e.g. for maintenance purposes, the operator may unscrew the engagement means 40 in order to remove the cover 20.

With reference to FIG. 6, when the float is inflated prior to ditching, the float exerts a force on the cover.

The fuse fastener member 45 then breaks. Thereafter, the cover can move away from the compartment 3. However the cover remains attached to the fuselage by the connection means 25.

At the end of inflation, the connection means are taut. The cover also remains attached to the aircraft via the connection means 25 in the first embodiment or via the connection means 25 and the float 15 in the second embodiment.

Naturally, the present invention may be subjected to numerous variations as to its implementation. Although several embodiments are described above, it will readily be understood that it is not conceivable to identify exhaustively all possible embodiments. It is naturally possible to replace any of the means described by equivalent without going beyond the ambit of the present invention.

What is claimed is:

1. A method of arranging a buoyancy system on an aircraft, said buoyancy system comprising an inflatable float and a cover, the method being characterized by the step of connecting said cover to a compartment of a fuselage of said aircraft via at least one extensible connection means in order to enable the cover to be retained and to be moved transversely away from the compartment while the float is inflating.

2. A method according to claim 1, wherein said cover is fastened to each connection means via reversible fastener means.

3. A method according to claim 1, wherein said cover is connected to the compartment via said connection means.

4. A method according to claim 1, wherein said cover is connected to the compartment via said connection means and the float, said float being fastened to at least one internal wall defining said compartment, said cover being fastened to the float via said connection means.

5. A method according to claim 1, wherein said float, once inflated, presents a bottom zone (ZINF) likely to impact against a liquid surface, and a top zone (ZSUP) that is not likely to impact said liquid surface, with said cover being arranged facing said top zone (ZSUP) and away from said bottom zone (ZINF).

6. A buoyancy system for an aircraft, said buoyancy system comprising an inflatable float and a cover, wherein said buoyancy system includes at least two extensible connection means fastened to the cover to connect the cover to a compartment of a fuselage of the aircraft, while enabling the cover to be retained and moved transversely away from the compartment during inflation of the float.

7. A system according to claim 6, wherein said buoyancy system includes one reversible fastener means per connection means in order to fasten each connection means reversibly to the cover.

8. A system according to claim 7, wherein said fastener means comprise a bracket fastened firstly to the cover by reversible engagement means and fastened secondly to connection means.

9. A system according to claim 7, wherein said fastener means include a fuse fastener member for fastening the cover to a compartment.

10. A system according to claim 6, wherein each connection means includes a fastener device for being fastened to a compartment of an aircraft.

11. A system according to claim 6, wherein each connection means includes a fastener system for fastening to the float.

12. A system according to claim 6, wherein said float includes a connection device connected to a compartment of an aircraft.

13. An aircraft having a fuselage with a compartment and a buoyancy system, said aircraft including at least one inflatable float arranged in said compartment, and a cover closing said compartment, wherein said buoyancy system is a system according to claim 6, and said buoyancy system includes at least one extensible connection means fastened to the cover in order to connect the cover to said compartment, while enabling the cover to be retained and to be moved transversely during inflation of the float.

14. The system according to claim 6 wherein the at least two connection means are fastened to opposite sides of the cover.

15. The system according to claim 6 wherein each extensible connection means comprises an elastic strap.

16. The system according to claim 6 wherein each extensible connection means has a first end region connected to the cover and a second end region connected to the compartment;
wherein the extensible connection means and the cover cooperate with the compartment to extend circumferentially around the float when the float is inflated.

17. The system according to claim 6 wherein each extensible connection means has a first end region connected to the cover and a second end region connected to the float, the float connecting each extensible connection means to the compartment;
wherein the float extends between each extensible connection means and the compartment when the float is inflated.

18. The system according to claim 6 wherein the float and the at least two extensible connection means are configured to be folded in the compartment when the cover is closed, each extensible connection means having a short length when folded and a long length when unfolded.

19. The system according to claim 9 wherein the cover remains attached to the compartment via the extensible connection means after the fuse fastener member has broken.

\* \* \* \* \*